United States Patent [19]

Stevens

[11] Patent Number: 5,494,551
[45] Date of Patent: Feb. 27, 1996

[54] SEGMENTED MATRIX APPARATUS FOR FORMING A TREAD PATTERN IN A RETREAD TIRE

[75] Inventor: William J. Stevens, Ferguson, Mo.

[73] Assignee: Teknor Apex Company, Pawtucket, R.I.

[21] Appl. No.: 329,146

[22] Filed: Oct. 24, 1994

[51] Int. Cl.$^6$ ............................ B29C 35/02; B29D 30/52
[52] U.S. Cl. ...................... 156/394.1; 156/96; 156/909; 425/17; 425/20; 425/47
[58] Field of Search ................................ 156/909, 394.1, 156/96; 425/20, 47, 17, 19, 24, 25, 46, 39

[56] References Cited

U.S. PATENT DOCUMENTS

| | | |
|---|---|---|
| 1,368,268 | 2/1921 | Legnard . |
| 1,429,831 | 9/1922 | Barney . |
| 1,746,763 | 2/1930 | Burdette . |
| 2,185,542 | 1/1940 | Daniel . |
| 3,479,693 | 11/1969 | Cantarutti ................................ 425/47 |
| 3,976,532 | 8/1976 | Barefoot . |
| 3,999,907 | 12/1976 | Pappas ..................................... 425/20 |
| 4,043,725 | 8/1977 | Schmidt .................................... 425/39 |
| 4,588,460 | 5/1986 | Magee et al. ............................ 156/96 |
| 4,767,480 | 8/1988 | Goldstein ................................. 156/96 |
| 5,342,462 | 8/1994 | King et al. ............................... 156/96 |
| 5,354,406 | 10/1994 | King et al. ............................... 425/20 |

*Primary Examiner*—Geoffrey L. Knable
*Attorney, Agent, or Firm*—Salter & Michaelson

[57] ABSTRACT

Apparatus for forming a tread pattern on a retread tire casing includes a plurality of rigid matrix segments each having a contoured tread pattern thereon. Each matrix segment is removably secured to a respective matrix segment holder. Each matrix segment holder includes guide blocks at the ends thereof, and the matrix segments are arranged in circumferential side-by-side relation. Guide shafts extend through aligned guide bores in adjacent guide blocks of adjacent matrix segment holders for guiding movement of matrix segment between a closed position wherein the matrix segments are in side-by-side abutting relation, and an open position wherein adjacent matrix segments are separated. A spring is received over each end of each guide shaft and captured between a recessed shoulder in the guide block and a threaded nut received over the end of the guide shaft. The springs normally bias the matrix segment into the closed position. In a first embodiment, diverging legs of inverted V-shaped cams extend into diverging bores in adjacent guide blocks for separating the adjacent matrix segments. Outward radial movement of the cams forces the matrix segments apart from the closed position to the open position for receiving a built-up tire casing therein. The compression springs thereafter forcibly return the matrix segments to the closed position wherein the contoured surfaces of the matrix segments are urged against the built up layer of uncured rubber. In a second embodiment, slotted plates extend across adjacent guide blocks for separating the matrix segments.

26 Claims, 8 Drawing Sheets

SEGMENTED MATRIX APPARATUS FOR FORMING A TREAD PATTERN IN A RETREAD TIRE

BACKGROUND AND SUMMARY OF THE INVENTION

The instant invention relates to apparatus for retreading tire casings, and more particularly to a segmented matrix apparatus for forming a tread pattern in a layer of uncured rubber applied on the surface of a tire casing.

Retreaded tires have heretofore been formed by building up a layer of uncured rubber on the surface of a buffed tire casing. The rubber is normally allowed to cool, and thereafter a plurality of matrix segments each having a plurality of tread ribs thereon is placed around the cooled, built up tire casing. An elastic strip is usually fitted around the matrix segments to hold the matrix segments in position on the tire casing and to urge the tread ribs into the rubber during curing. When the matrix segments are applied to the outer surface of the tire casing, gaps are provided between the ends of the matrix segments so that when the matrix ribs sink into the rubber, the ends of the matrix segments will end up in abutting relation. The tire casing and matrix are then placed in an elastic sealing envelope which further holds the matrix segments in place. The edges of the envelope are then sealed to the tire bead to close the envelope. The sealing envelope also includes an air path for drawing a vacuum within the envelope to draw air from between the matrix and rubber surface during curing. The whole assembly is then placed in a vulcanizing or autoclave chamber capable of high temperature and pressure. While in the vulcanizing chamber, the temperature is increased to the desired level and then a vacuum is drawn within the envelope thereby allowing the tread ribs to sink into the now warm rubber. The pressure in the chamber is then increased to the desired level to continue the curing process. It is important that an even pressure be exerted around the circumference of the tire casing so that the tread pattern is evenly imprinted into the rubber. Without even pressure, the rubber tends to sag toward the lowest mold point while in its plastic state. Accordingly, sinking of the tread imprint in the rubber is normally assisted by the high chamber pressure applied to the matrix.

While the above apparatus and curing procedures appear to be relatively effective, it has been found that the apparatus is costly and complicated, and that the process is time consuming. Two particular time consuming problems are applying the matrix to the tire casing and sealing the envelope to the bead of the tire casing. The edges of the sealing envelope must be sealed with a special sealing bead against the bead of the tire. In order to draw a vacuum inside the envelope while the assembly is inside the chamber, various hoses are provided within the chamber to draw the vacuum and to exhaust air. Another time consuming problem is removal of the assembly from the cured tire casing. The matrix segments must be carefully withdrawn from the tire casing so that the new tread imprint is not damaged.

Accordingly, among the several objects of the invention are the provision of segmented matrix holders which hold the matrix segments in a circumferential arrangement and guide their movement between open and closed positions; the provision of a segmented matrix apparatus which does not require a sealing envelope to draw a vacuum; and the provision of a matrix apparatus that does not require a rim or pressurized tube to exert an outward radial force.

Another object of the invention is the provision of a segmented matrix system wherein the matrix segments are easily removable and recyclable.

The above objects are accomplished in the instant invention by a segmented matrix apparatus which comprises a plurality of rigid matrix segments each having a contoured tread pattern on an inwardly facing side thereof. Each matrix segment is removably secured by removable fasteners to a respective matrix segment holder. The matrix segments are arranged in circumferential side-by-side relation to form a continuous circular matrix. Guide shafts extend between adjacent matrix segment holders for guiding movement of matrix segments between a closed position wherein the matrix segments are in side-by-side abutting relation thereby forming a continuous tread matrix, and an open position wherein adjacent matrix segments are separated for receipt of a built up tire casing therein. The guide shafts include spring apparatus for normally biasing the matrix segments into the closed position. The apparatus further includes a plurality of cam mechanisms mounted with the matrix segment holders and means for actuating the cam mechanisms to force the matrix segments apart from their normally closed position to the open position for receiving a built-up tire casing therein. The springs thereafter forcibly return the matrix segments to their closed position wherein the contoured surfaces of the matrix segments are urged against the built up layer of uncured rubber.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 1:
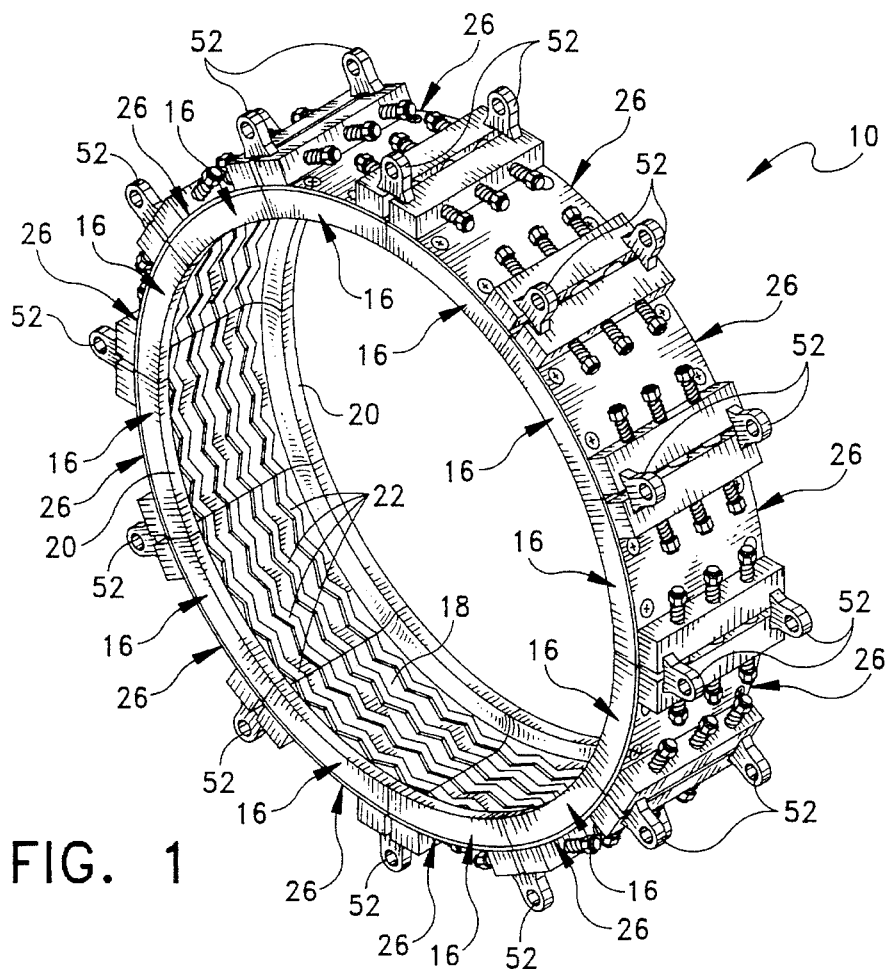
FIG. 1 is a perspective view of the instant segmented mold apparatus.
Figure 2:
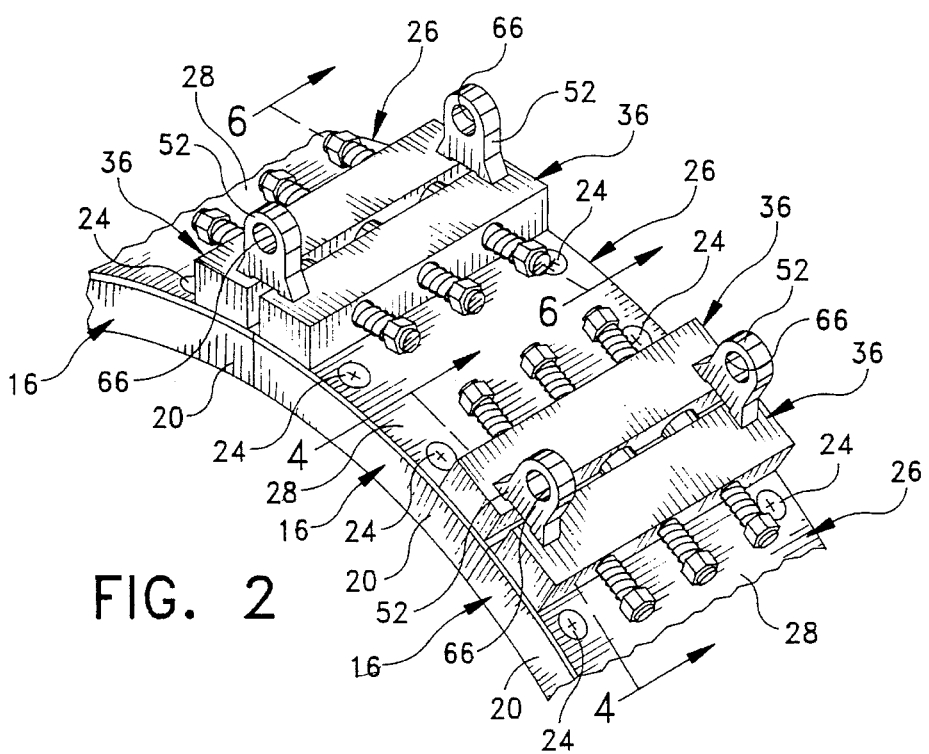
FIG. 2 is an enlarged perspective view of several adjacent mold segments.
Figure 3:
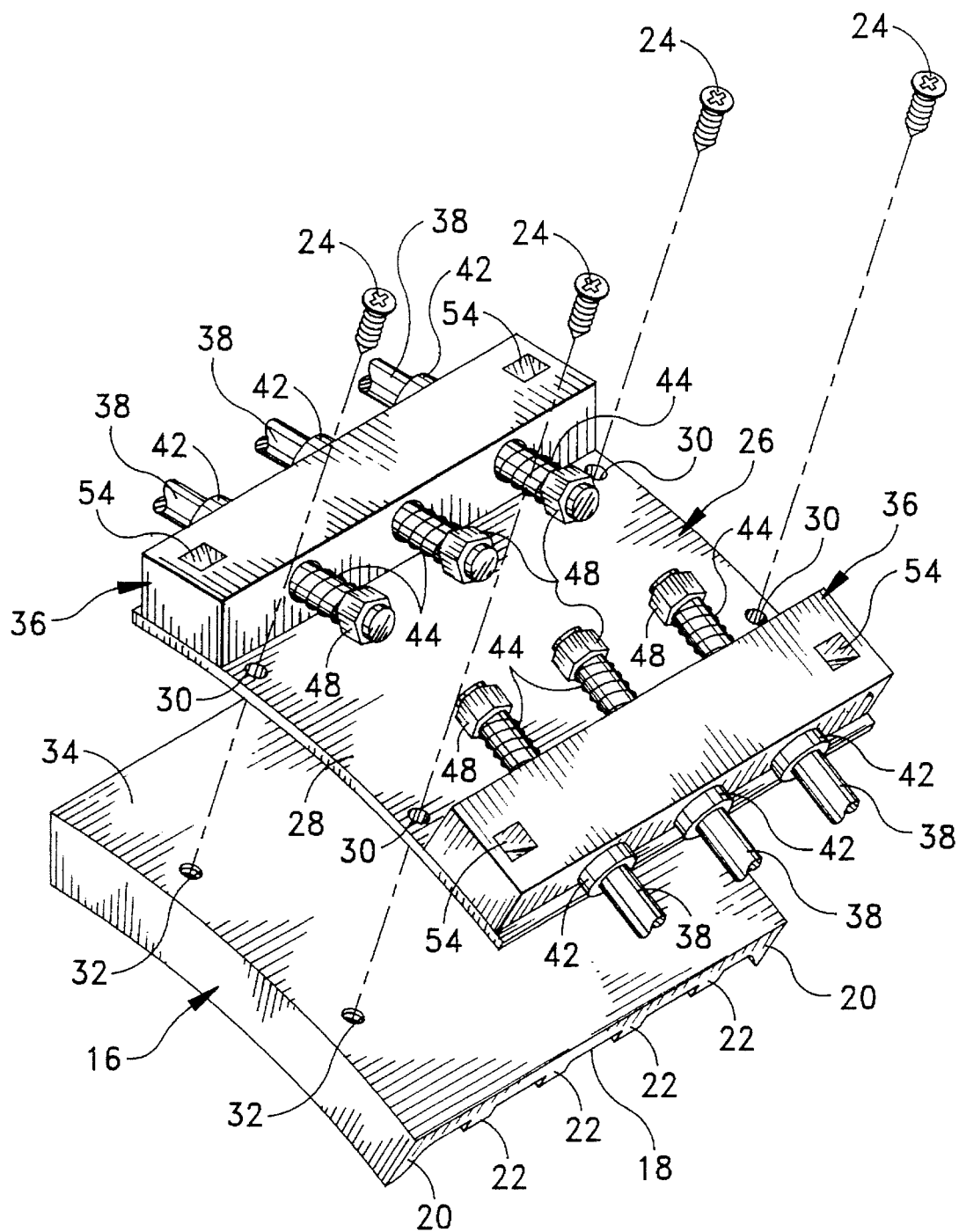
FIG. 3 is an exploded perspective view thereof.
Figure 4:
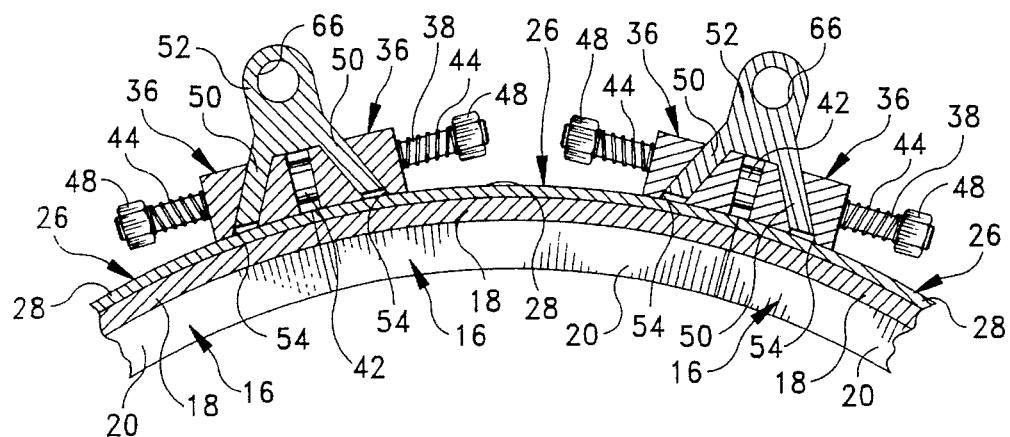
FIG. 4 is a cross-sectional view thereof taken along line 4—4 of FIG. 2.
Figure 5:
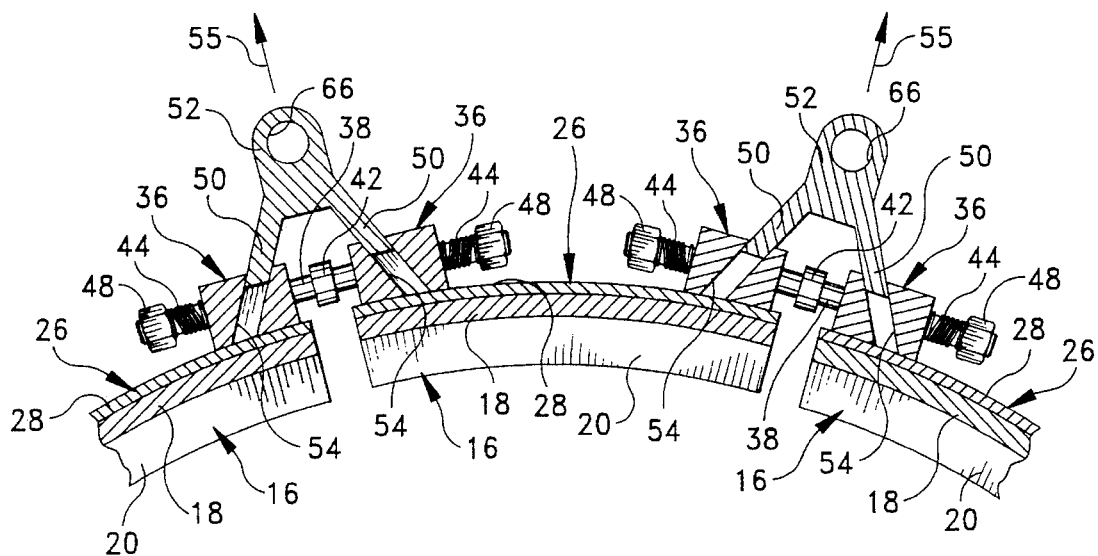
FIG. 5 is a similar view with the inverted V-cams lifted and the mold segments partially separated.
Figure 6:
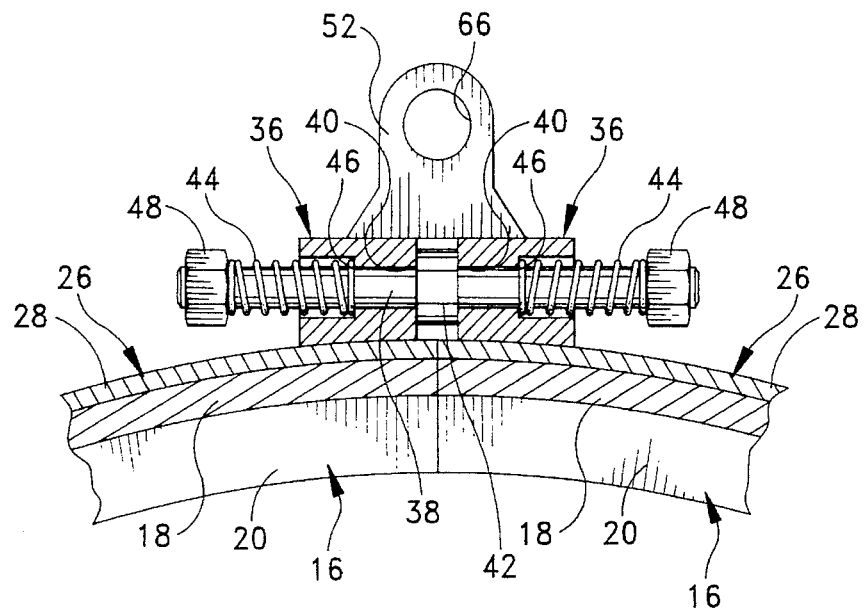
FIG. 6 is a cross-sectional view thereof taken along line 6—6 of FIG. 2.
Figure 7:
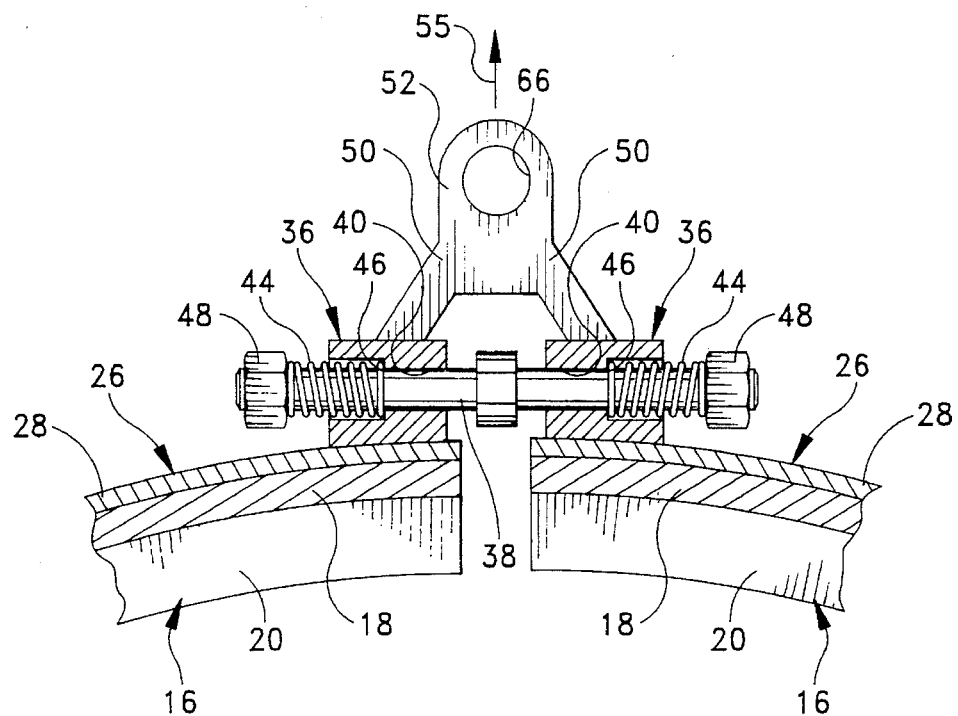
FIG. 7 is a similar view showing the compression spring in a compressed state.

Referring now to the drawings, a first embodiment of the segmented matrix apparatus of the instant invention is illustrated and generally indicated at 10 in FIGS. 1–9. As will hereinafter be more fully described, the instant apparatus 10 is operative for forming a tread pattern in a layer of uncured rubber 12 (FIG. 9) which is built up on a buffed tire casing 14. The procedures for applying the layer of uncured rubber 12 to the tire casing 14 are well known in the art, and therefore will not be described herein.

The apparatus 10 comprises a plurality of arcuate, rigid matrix segments generally indicated at 16, each having a contoured tread pattern on an arcuate inwardly facing surface thereof. The matrix segments 16 have a generally U-shaped cross section including a body portion 18 and side portions 20 depending therefrom. The inwardly facing surface of the body portion 18 includes a plurality of parallel, inwardly extending tread ribs 22 which are imbedded into the layer of uncured rubber 12 on the tire casing 14 for forming a tread imprint therein. The matrix segments 16 are preferably formed from a durable, rigid material, such as steel, or other metallic materials. However, it is contemplated that the segments 16 will also be fabricated from rigid plastics, and rubber materials. It is pointed out however, that the matrix material must have a melting temperature which is greater than the curing temperature of the rubber 12.

Each matrix segment 16 is removably secured by a plurality of threaded fasteners 24 to a respective matrix segment holder generally indicated at 26. Each matrix segment holder 26 is identical in construction and is preferably constructed from a durable metal, such as steel. Each matrix segment holder 26 comprises an arcuate plate portion 28 having first and second ends, and a length equal to the length of the matrix segments 16. The threaded fasteners 24 extend downwardly through openings 30 (FIG. 3) adjacent the side edges of the arcuate plate 28 and into threaded bores 32 (FIG. 3) formed in the outwardly facing surface 34 of the matrix segment 16. One important aspect of the invention is that the matrix segments 16 are readily removable from the matrix segment holders 26 so that the matrix pattern may be easily changed according to customer demand and changing tread patterns. The fact that the matrix segments 16 are removable allows them to be easily recycled when a particular tread pattern is no longer desired. In this regard, the metal, or plastic, or rubber matrix segments 16 can be shredded and recast into new matrix segments for further use. Each matrix segment holder 26 further includes first and second guide blocks generally indicated at 36 respectively positioned at the opposite ends of the plate portion 28 on the outwardly facing surface thereof. As illustrated in FIG. 1, the matrix segment holders 26 and their attached matrix segments 16 are arranged in circumferential side-by-side relation to form a continuous circular matrix.

The apparatus 10 further includes guide apparatus comprising a plurality of guide shafts 38 for holding the matrix segments holders 26 in assembled relation and for guiding movement of the matrix segment holders 26 with respect to each other. The guide shafts 38 extend through aligned guide bores 40 in adjacent guide blocks 36 of adjacent matrix segment holders 26. Preferably, each pair of adjacent guide blocks 36 is guided by three spaced guide shafts 38. Each guide shaft 38 includes a centrally located spacer 42 which is captured between the adjacent guide blocks 36. The guide bores 40 are preferably formed so that the guide shafts 38 extend perpendicular to the radius of the arcuate matrix segments 16. The guide shafts 38 are operable for guiding movement of matrix segment holders 26 between a closed position (FIGS. 1, 2, 4 and 6) wherein the matrix segments 16 are in side-by-side abutting relation, and an open position (FIGS. 5 and 7) wherein adjacent matrix segments 16 are separated. It is pointed out that the apparatus preferably comprises twelve matrix segments 16 because the separation of the segments 16 and the size of the gap therebetween are greatly reduced. Reducing the number of segments 16 would require the gap therebetween to be greater to receive a tire casing 14 therein.

A compression spring 44 is received over each end of each guide shaft for normally biasing the matrix segments 16 to the closed position. Each spring 44 is captured between a recessed shoulder 46 (FIGS. 3, 6 and 7) in the guide block 36 and a threaded nut 48 on the end of the guide shaft 38. The threaded nuts 48 are threadedly movable along the length of the guide shafts 38 to adjust the compression of the springs 44. The compressed springs 44 exert a tangential force which normally biases the matrix segments 16 into the closed position.

The apparatus still further comprises an actuator assembly for actuating the matrix segment holders 26 between the open and closed positions. In this connection, diverging legs 50 of inverted V-shaped cams 52 extend into diverging bores 54 (FIG. 3, 4 and 5) in adjacent guide blocks 36. Outward radial movement of the cams 52 (see arrows 55 in FIGS. 5 and 7) forces the matrix segment holders 26 apart from the closed position (FIGS. 4 and 6) to the open position (FIGS. 5 and 7) for receiving a built-up tire casing therein. The compression springs 44 are thereafter operative for forcibly returning the matrix segments 16 to the closed position wherein the tread ribs 22 of the matrix segments 16 are urged against the built up layer of uncured rubber 12.

Figure 8:
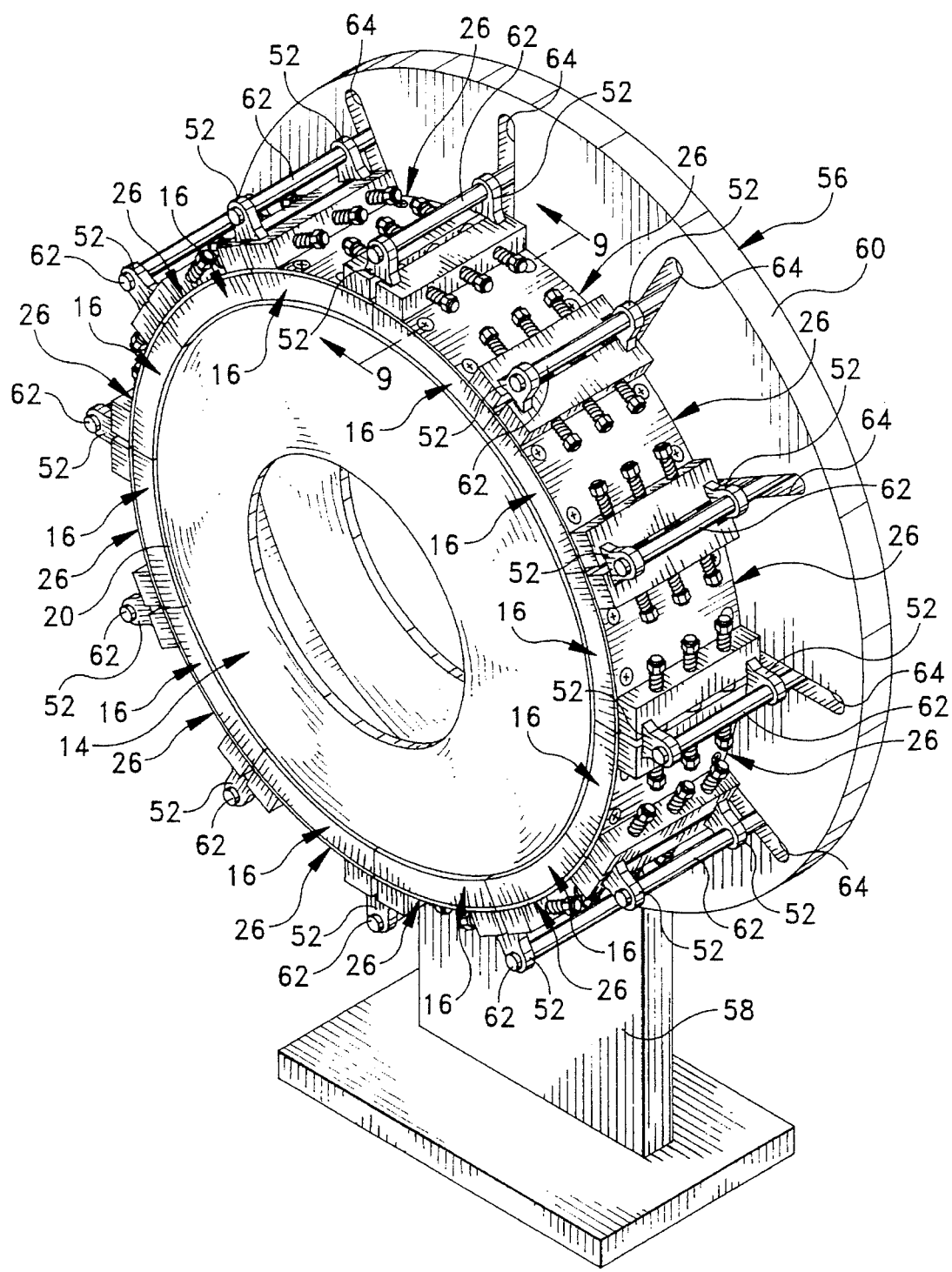
FIG. 8 is a perspective view of the mold apparatus mounted on an actuator assembly with a tire mounted therein.
Figure 9:
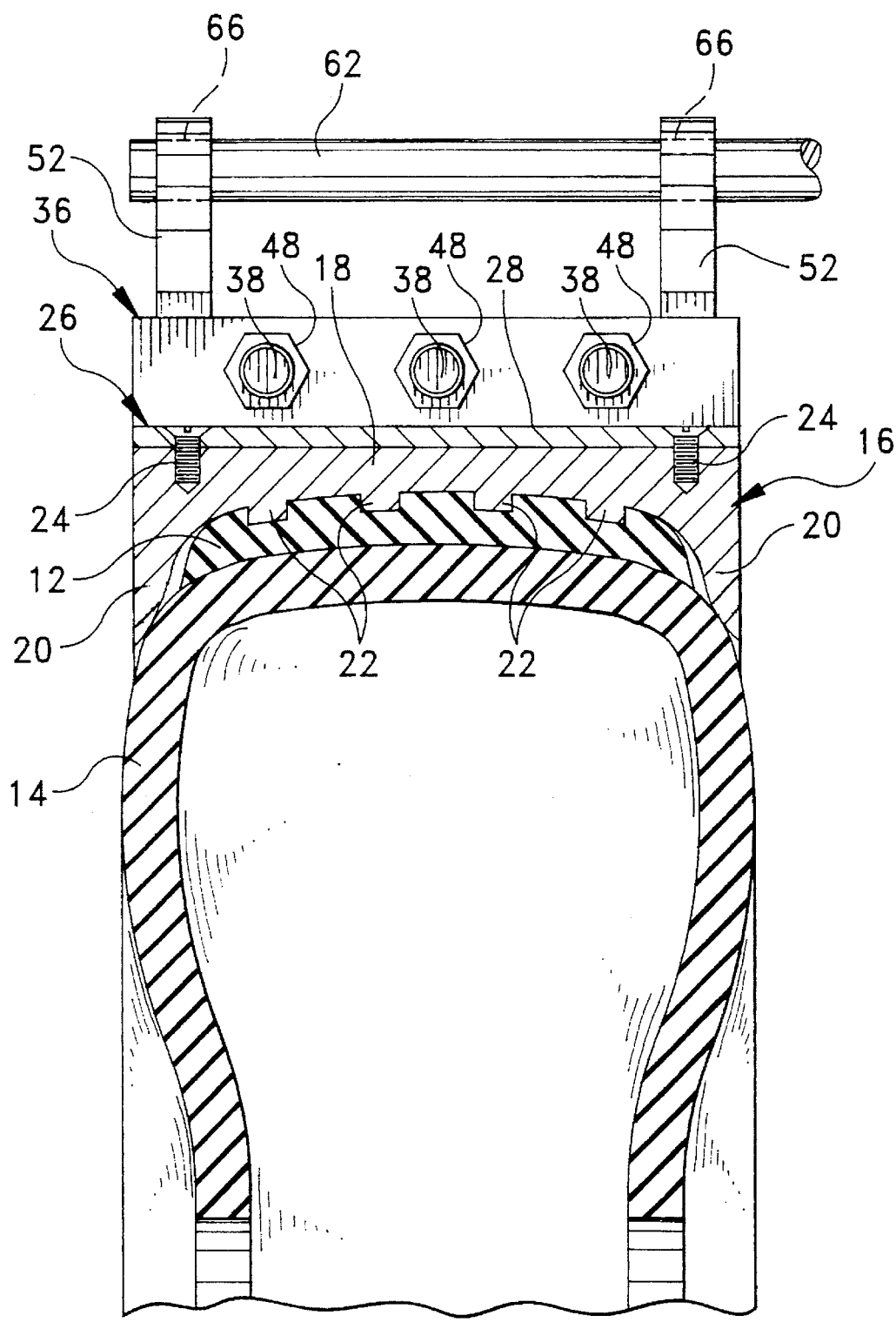
FIG. 9 is a cross-sectional view thereof taken along line 9—9 of FIG. 8.

Referring now to FIG. 8, there is shown actuator apparatus generally indicated at 56 for opening and closing the instant segmented matrix apparatus 10. The actuator apparatus 56 comprises a frame 58, and a circular head portion 60 having a plurality of circumferentially spaced, radially movable actuator rods 62 protruding outwardly therefrom. The actuator rods 62 are preferably mounted on carriers (not shown) within radial slots 64 formed in the head 62 and are preferably movable by means of rotatable threaded shafts (not shown) which extend through a threaded bore in the carrier. The actuator apparatus 56 further includes motor means (not shown) for rotating the threaded shafts to radially move the actuator rods 62 inwardly and outwardly. The apparatus 56 as herein contemplated and illustrated is more specifically described in the Barefoot U.S. Pat. No. 3,976, 532, and therefore no further description thereof will be given herein.

In use, the segmented matrix apparatus 10 is mounted onto the actuator apparatus 56 by slidably extending aligned bores 66 in the inverted cams over the actuator rods 62. (See FIG. 8). The rods 62 are then actuated to move radially outwardly thereby drawing the inverted cam legs 50 out of the diverging bores 54 against the bias of the springs 44 and causing the matrix segments 16 be separated. (See FIGS. 4 and 5). While the matrix segments 16 are separated, a built up tire casing 14 is placed within the interior of the segmented matrix apparatus 10. Preferably, the tire casing 14 is placed within the matrix apparatus 10 immediately after application of the layer of uncured rubber 12 while the rubber 12 is still warm and in a plastic state. The actuator rods 62 are then moved radially inwardly to close the matrix apparatus 10. As the apparatus 10 is closed, the tread ribs 22 on the inwardly facing surface of the individual matrix segments 16 are imbedded into the still warm layer of uncured rubber 12 thereby forming the negative tread imprint therein. (See FIG. 9). Closure of the apparatus 10 is aided by the tangential forces of the plurality of springs 44 mounted on the guide shafts 38. It is pointed out that the use of the spring system in the instant apparatus eliminates the need of a sealing sleeve as utilized in the prior art. Accordingly, there is no need for the vacuum and exhaust lines within the autoclave chamber. This improvement, in and of itself, will provide significant savings in equipment costs, and in labor costs to connect and disconnect the air lines during loading and unloading. Furthermore, is it noted that no inner rim is required in the instant apparatus to exert outward radial force. This eliminates still another step in the retread process.

After the matrix apparatus 10 is mounted onto the tire casing 14, the entire assembly (apparatus 10 and casing 14) is slidably removed from the actuator apparatus 56 and placed in a conventional curing chamber (not shown). Since there is no inner rim applied to the tire casing 14, heat is more evenly applied to the tire casing 14, both on the inside and the outside surfaces thereof. Accordingly, the curing time in the instant invention is reduced.

While it has not as yet been tested, it is believed that the spring pressure will provide sufficient pressure to the rubber layer 12 so that a pressurized autoclave chamber will no longer be necessary. In this case, the assembly may be placed in a simple oven-like structure for curing. If this is possible, additional savings in equipment costs and time (loading and unloading) will be recognized. The safety risks associated with loading and unloading pressurized autoclave chambers will also be eliminated.

After curing is completed, the assembly is removed from the curing chamber and remounted on the actuator apparatus 56. The actuator rods 62 are again actuated radially outwardly wherein the matrix segments 16 are separated from each other and from the rubber 12. The outward radial movement of the matrix segments 16 withdraws the treads ribs 22 from the rubber 12 in a radial direction and thereby effectively prevents any tearing of the rubber. Use of the instant apparatus 10 therefore leads to fewer product defects. The tire casing 14 is then easily removed from within the matrix apparatus 10.

In an alternative retreading method, the tire casing 14 may be inserted into the matrix apparatus 10 after the uncured rubber 12 has cooled. In this case, the matrix 10 is closed only to a point where the tread ribs 22 sit on top of the layer of uncured rubber 12. The springs 44 maintain the tread ribs 22 in pressured engagement with the rubber layer surface after the matrix 10 is removed from the actuator apparatus 56. When the assembly is placed within the curing chamber, the rubber 12 assumes a plastic state as the temperature rises. While in its plastic state, the pressure of the springs 44 draws the matrix segments 16 together and forces the tread ribs 22 into the rubber 12. The elevated temperature and pressure then serve to cure the rubber 12 according to normal procedure.

Figure 10:
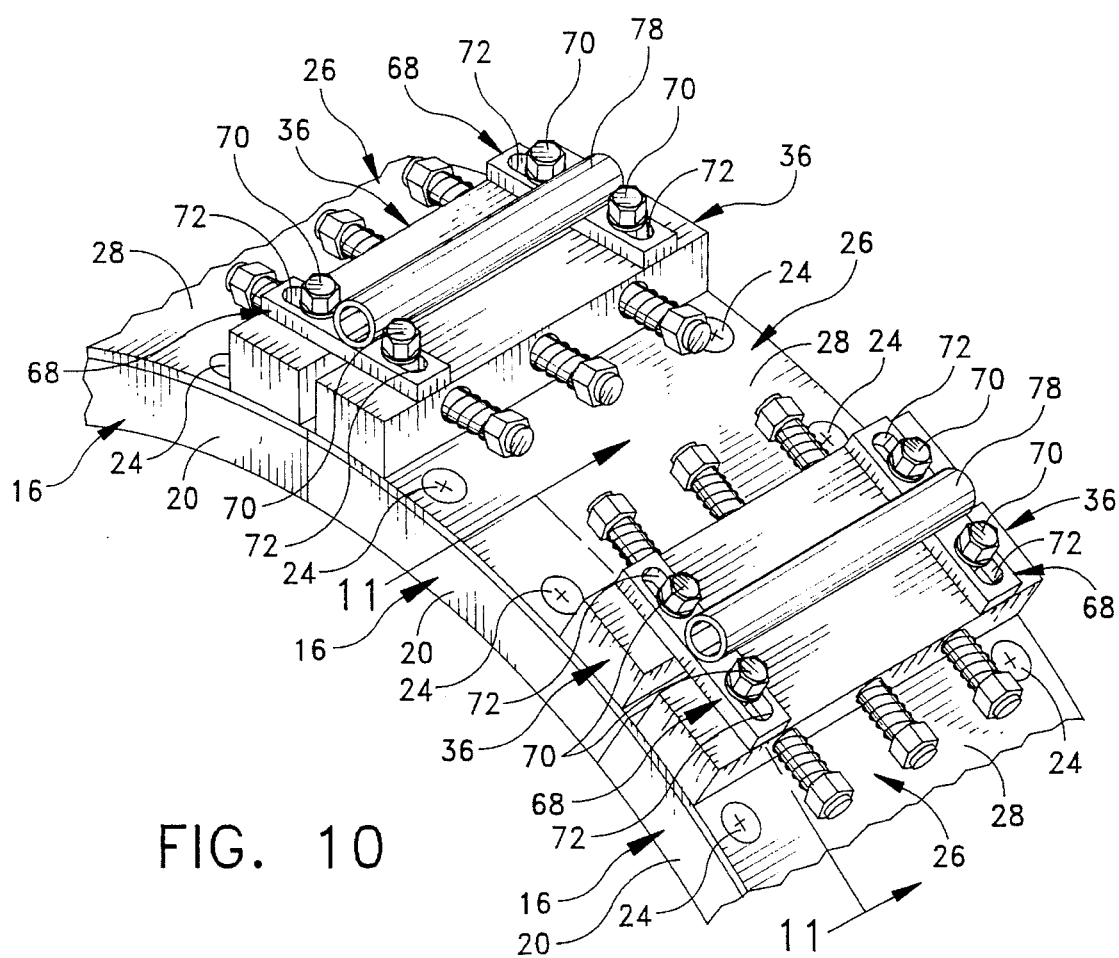
FIG. 10 is a perspective view of a second embodiment of the mold apparatus.
Figure 11:
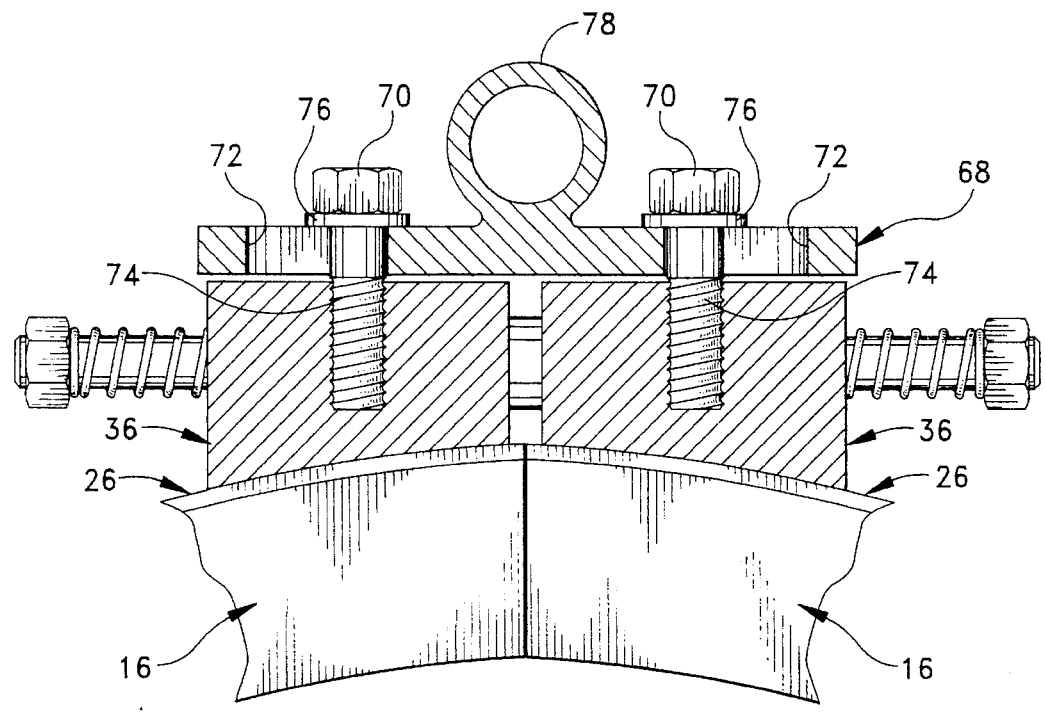
FIG. 11 is a cross-sectional view thereof taken along line 11—11 of FIG. 10.
Figure 12:
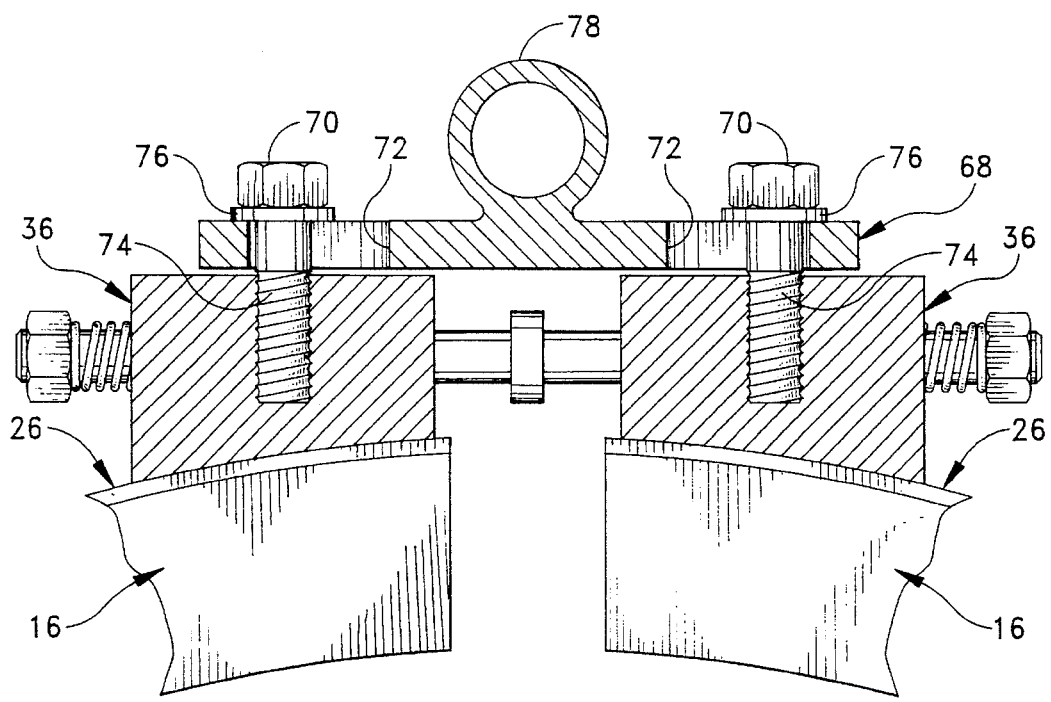
FIG. 12 is another cross-sectional view with the matrix segments separated.

Referring now to FIGS. 10–12, an alternative actuator arrangement for separating the adjacent matrix segments 16 is illustrated. In this connection, the inverted cams 52 are replaced by slotted plates generally indicated at 68. Slotted plates 68 extend across adjacent guide blocks 36 at each end thereof. The slotted plates 68 are slidably secured to the guide blocks 36 by threaded bolts 70 which extend through slots 72 formed in the plates 68 and into threaded bores 74 (FIGS. 11 and 12) formed in the guide blocks 36. Each bolt 70 includes a washer 76 (FIGS. 11 and 12) to facilitate sliding movement thereof. A tubular receptacle 78 is secured across each pair of slide plates 68 by welding on other suitable attachment means. As described previously, apparatus 10 is receivable onto the actuator apparatus 56 with the actuator rods 62 being slidably received into the receptacles 78 for radial movement of the slide plates 68.

In operation, the sliding plates 68 are moved from a first position (FIG. 11) wherein the segments 16 are adjacent; and a second position (FIG. 12) wherein the segments 16 are separated. In this regard, as the plates 68 are moved radially outwardly they operate to pull the matrix segments 16 apart.

It can therefore be seen that the instant invention provides a unique and advantageous segmented matrix apparatus 10 for retreading tire casings 14. The apparatus 10, while comprising a plurality of individual segments 16, operates as a unitary structure by employing a system of guide shafts 38 and springs 44. The inverted cam mechanisms 52 and powered actuator apparatus 56 greatly simplify mounting and removal of the matrix 10 from the tire casing. The matrix segments 16 are also removably mounted to their respective holders 26 thereby simplifying matrix segment replacement when pattern changes are required. The matrix segments 16 may thereafter be recycled when a particular tread pattern becomes obsolete. The compression spring system urges the matrix segments 16 into a normal abutting relation once a tire 14 is mounted into the matrix apparatus 10 and thereby eliminates the need for a sealing sleeve and accompanying vacuum hoses within the curing chamber. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

I claim:

1. Apparatus for forming a tread pattern in a layer of uncured rubber built up on a tire casing comprising:

a plurality of rigid matrix segments each having a negative contoured tread pattern on an arcuate inwardly facing side thereof;

a plurality of matrix segment holders;

removable fasteners for removably attaching each matrix segment to a respective matrix segment holder, said plurality of matrix segments being arranged in side-by-side circumferential relation;

guide means extending between each pair of adjacent matrix segment holders for guiding movement of said matrix segments between a closed position wherein said matrix segments are in side-by-side abutting relation thereby forming a continuous circumferential matrix, and an open position wherein adjacent matrix segments are separated;

spring means for normally biasing said adjacent matrix segment holders into said closed position; and cam means extending between adjacent matrix segment holders and cooperating with said guide means for forcibly moving said adjacent matrix segment holders from said closed position to said open position for receiving a built-up tire casing therein, said spring means thereafter being operable for forcibly returning said adjacent matrix segments to said closed position wherein said contoured surfaces of said matrix segments are urged against said built up layer of uncured rubber on said tire casing.

2. In the apparatus of claim 1, said removable fasteners extending through said matrix segment holder and being received in an outwardly facing surface of said matrix segment.

3. In the apparatus of claim 2, said removable fasteners comprising threaded fasteners which are received in threaded bores in said outer surfaces of said matrix segments.

4. In the apparatus of claim 1, said matrix segment holders each having first and second spaced ends, said guide means comprising first and second guide blocks respectively positioned at said first and second ends of each of said matrix segment holders and further comprising a plurality of guide shafts which extend through aligned guide bores in adjacent guide blocks of adjacent matrix segment holders.

5. In the apparatus of claim 4, said guide shafts extending perpendicular to a radius of said circumferentially positioned matrix segments.

6. Apparatus for forming a tread pattern in a layer of uncured rubber built up on a tire casing comprising:

a plurality of rigid matrix segments each having a negative contoured tread pattern on an arcuate inwardly facing side thereof;

a plurality of matrix segment holders;

removable fasteners for removably attaching each matrix segment to a respective matrix segment holder, said plurality of matrix segments being arranged in side-by-side circumferential relation;

guide means extending between each pair of adjacent matrix segment holders for guiding movement of said matrix segments between a closed position wherein said matrix segments are in side-by-side abutting relation thereby forming a continuous circumferential matrix, and an open position wherein adjacent matrix segments are separated, said matrix segment holders each having first and second spaced ends, said guide means comprising first and second guide blocks respectively positioned at said first and second ends of each of said matrix segment holders and further comprising a plurality of guide shafts which extend through aligned guide bores in adjacent guide blocks of adjacent matrix segment holders;

spring means for normally biasing said adjacent matrix segment holders into said closed position, said spring means comprising a compression spring received over each end of each guide shaft, each compression spring being captured between an increased diameter flange at the respective end of the guide shaft and a recessed shoulder in the respective guide block; and an actuator for selectively actuating said adjacent matrix segment holders from said closed position to said open position for receiving a built-up tire casing therein, said spring means thereafter being operable for forcibly returning said adjacent matrix segments to said closed position wherein said contoured surfaces of said matrix segments are urged against said built up layer of uncured rubber on said tire casing.

7. In the apparatus of claim 6, said flanges at said ends of said guide shafts comprising inwardly threaded nuts which are threadedly received onto outwardly facing threads formed at each end of each guide shaft, said threaded nuts being threadedly adjustable along a length of said respective guide shaft for adjusting a compression of said captured spring.

8. In the apparatus of claim 6, said actuator comprising a slotted plate extending across adjacent guide blocks, said slotted plate being slidably secured to said guide blocks by fasteners which extend through slots formed in said plate.

9. In the apparatus of claim 8, said slotted plate including a receptacle for receiving means for moving said plate in a radial direction.

10. In the apparatus of claim 9, said receptacle comprising a tube secured to said slotted plate and extending perpendicular to said guide shafts.

11. Apparatus for forming a tread pattern in a layer of uncured rubber built up on a tire casing comprising:

a plurality of rigid matrix segments each having a negative contoured tread pattern on an arcuate inwardly facing side thereof;

a plurality of matrix segment holders;

removable fasteners for removably attaching each matrix segment to a respective matrix segment holder, said plurality of matrix segments being arranged in side-by-side circumferential relation;

guide means extending between each pair of adjacent matrix segment holders for guiding movement of said matrix segments between a closed position wherein said matrix segments are in side-by-side abutting relation thereby forming a continuous circumferential matrix, and an open position wherein adjacent matrix segments are separated, said matrix segment holders each having first and second spaced ends, said guide means comprising first and second guide blocks respectively positioned at said first and second ends of each of said matrix segment holders and further comprising a plurality of guide shafts which extend through aligned guide bores in adjacent guide blocks of adjacent matrix segment holders;

spring means for normally biasing said adjacent matrix segment holders into said closed position; and an actuator for selectively actuating said adjacent matrix segment holders from said closed position to said open position for receiving a built-up tire casing therein, said spring means thereafter being operable for forcibly returning said adjacent matrix segments to said closed position wherein said contoured surfaces of said matrix segments are urged against said built up layer of uncured rubber on said tire casing, said actuator comprising a plurality of inverted V-shaped cams each having a pair of diverging legs which are respectively slidably received into aligned diverging bores formed in adjacent guide blocks of each pair of adjacent matrix segment holders.

12. In the apparatus of claim 11, said inverted V-shaped cams each including a receptacle for receiving means for moving said cam in a radial direction.

13. In the apparatus of claim 12, said receptacle comprising a bore extending perpendicular to said legs of said cam.

14. In the apparatus of claim 11, each of said pairs of adjacent guide blocks including two spaced cams.

15. Apparatus for forming a tread pattern in a layer of uncured rubber built up on a tire casing comprising:

a plurality of rigid matrix segments each having a negative contoured tread pattern on an arcuate inwardly facing side thereof, said plurality of matrix segments being arranged in side-by-side circumferential relation;

guide means extending between each pair of adjacent matrix segments for guiding movement of said matrix segments between a closed position wherein said matrix segments are in side-by-side abutting relation thereby forming a continuous circumferential matrix, and an open position wherein adjacent matrix segments are separated;

spring means for normally biasing said adjacent matrix segments into said closed position; and cam means extending between adjacent matrix segments and cooperating with said guide means for forcibly moving said adjacent matrix segments from said closed position to said open position for receiving a built-up tire casing therein, said spring means thereafter being operable for forcibly returning said matrix segments to said closed position wherein said contoured surfaces of said matrix segments are urged against said built up layer of uncured rubber on said tire casing.

16. In the apparatus of claim 15, said matrix segments each having first and second spaced ends, said guide means comprising first and second guide blocks respectively positioned at said first and second ends of each of said matrix segments, and further comprising a plurality of guide shafts which extend through aligned guide bores in adjacent guide blocks of adjacent matrix segments.

17. In the apparatus of claim 16, said guide shafts extending perpendicular to a radius of said circumferentially positioned matrix segments.

18. Apparatus for forming a tread pattern in a layer of uncured rubber built up on a tire casing comprising:

a plurality of rigid matrix segments each having a negative contoured tread pattern on an arcuate inwardly facing side thereof, said plurality of matrix segments being arranged in side-by-side circumferential relation;

guide means extending between each pair of adjacent matrix segments for guiding movement of said matrix segments between a closed position wherein said matrix segments are in side-by-side abutting relation thereby forming a continuous circumferential matrix, and an open position wherein adjacent matrix segments are separated, said matrix segments each having first and second spaced ends, said guide means comprising first and second guide blocks respectively positioned at said first and second ends of each of said matrix segments and further comprising a plurality of guide shafts which extend through aligned guide bores in adjacent guide blocks of adjacent matrix segments;

spring means for normally biasing said adjacent matrix segments into said closed position, said spring means comprising a compression spring received over each end of each guide shaft, said compression springs being captured between an increased diameter flange at the respective end of the guide shaft and a recessed shoulder in the respective guide block; and an actuator for selectively actuating said matrix segments from said closed position to said open position for receiving a built-up tire casing therein, said spring means thereafter being operable for forcibly returning said matrix segments to said closed position wherein said contoured surfaces of said matrix segments are urged against said built up layer of uncured rubber on said tire casing.

19. In the apparatus of claim 18, said flanges at said ends of said guide shafts comprising inwardly threaded nuts which are threadedly received onto outwardly facing threads formed at each end of each guide shaft, said threaded nuts being threadedly adjustable along a length of said respective guide shaft for adjusting a compression of said captured spring.

20. In the apparatus of claim 18, said actuator comprising a slotted plate extending across adjacent guide blocks, said slotted plate being slidably secured to said guide blocks by fasteners which extend through slots formed in said plate, said actuator further comprising means for selectively moving said slotted plate radially outwardly with respect to said arcuate matrix segments.

21. In the apparatus of claim 20, said slotted plate including a receptacle for receiving said means for moving said plate in a radial direction.

22. In the apparatus of claim 21, said receptacle comprising a tube secured to said slotted plate and extending perpendicular to said guide shafts.

23. Apparatus for forming a tread pattern in a layer of uncured rubber built up on a tire casing comprising:

a plurality of rigid matrix segments each having a negative contoured tread pattern on an arcuate inwardly facing side thereof, said plurality of matrix segments being arranged in side-by-side circumferential relation;

guide means extending between each pair of adjacent matrix segments for guiding movement of said matrix segments between a closed position wherein said matrix segments are in side-by-side abutting relation thereby forming a continuous circumferential matrix, and an open position wherein adjacent matrix segments are separated, said matrix segments each having first and second spaced ends, said guide means comprising first and second guide blocks respectively positioned at said first and second ends of each of said matrix segments and further comprising a plurality of guide shafts which extend through aligned guide bores in adjacent guide blocks of adjacent matrix segments;

spring means for normally biasing said adjacent matrix segments into said closed position; and an actuator for selectively actuating said matrix segments from said closed position to said open position for receiving a built-up tire casing therein, said spring means thereafter being operable for forcibly returning said matrix segments to said closed position wherein said contoured surfaces of said matrix segments are urged against said built up layer of uncured rubber on said tire casing, said actuator comprising a plurality of inverted V-shaped cams each having a pair of diverging legs which are respectively slidably received into aligned diverging bores formed in adjacent guide blocks of each pair of adjacent matrix segments.

24. In the apparatus of claim 23, said inverted V-shaped cams each including a receptacle for receiving means for moving said cam in a radial direction.

25. In the apparatus of claim 24, said receptacle comprising a bore extending perpendicular to said legs of said cam.

26. In the apparatus of claim 21, each of said pairs of adjacent guide blocks including two spaced cams.

* * * * *